US010983918B2

(12) United States Patent
Manganelli et al.

(10) Patent No.: US 10,983,918 B2
(45) Date of Patent: Apr. 20, 2021

(54) HYBRID LOGICAL TO PHYSICAL CACHING SCHEME

(71) Applicant: Micron Technology, Inc., Boise, ID (US)

(72) Inventors: Carminantonio Manganelli, Benevento (IT); Yoav Weinberg, Ontario (CA); Alberto Sassara, Naples (IT); Paolo Papa, Naples (IT); Luigi Esposito, Piano di Sorrento (IT); Giuseppe D'Eliseo, Caserta (IT); Angelo Della Monica, Casaluce (IT); Massimo Iaculo, San Marco Evangelista (IT)

(73) Assignee: Micron Technology, Inc., Boise, ID (US)

(*) Notice: Subject to any disclaimer, the term of this patent is extended or adjusted under 35 U.S.C. 154(b) by 76 days.

(21) Appl. No.: 16/294,427

(22) Filed: Mar. 6, 2019

(65) Prior Publication Data

US 2020/0210344 A1    Jul. 2, 2020

Related U.S. Application Data

(60) Provisional application No. 62/787,043, filed on Dec. 31, 2018.

(51) Int. Cl.
*G06F 12/1009* (2016.01)

(52) U.S. Cl.
CPC .... *G06F 12/1009* (2013.01); *G06F 2212/657* (2013.01)

(58) Field of Classification Search
None
See application file for complete search history.

(56) References Cited

U.S. PATENT DOCUMENTS

| 2014/0136767 | A1* | 5/2014 | Lee ............. | G06F 12/0246 711/103 |
| 2016/0098355 | A1* | 4/2016 | Gorobets ........ | G06F 12/1009 711/203 |
| 2017/0177497 | A1  | 6/2017 | Chun et al. | |
| 2018/0024779 | A1* | 1/2018 | Kojima ........... | G06F 3/0604 711/103 |
| 2018/0121364 | A1* | 5/2018 | Edgar ............. | G06F 12/1009 |

* cited by examiner

*Primary Examiner* — Denise Tran
(74) *Attorney, Agent, or Firm* — Schwegman Lundberg & Woessner, P.A.

(57) ABSTRACT

A variety of applications can include systems and methods that utilize a hybrid logical to physical (L2P) caching scheme. A L2P cache and a L2P changelog in a storage device can be controlled for use in write and read operations of a memory system. A page pointer table in the L2P cache can be accessed, for performance of a write operation in the memory system, to obtain a specific physical address mapped to a specified logical block address from a host, where the access is based on the page pointer table loaded into the L2P cache from the L2P changelog. The L2P cache area can be progressively configured with the most frequently accessed page pointer tables in the L2P changelog in the latest host accesses.

20 Claims, 10 Drawing Sheets

L2P CACHE 640

| SLOT 0 | SLOT 1 | SLOT 2 | ... | SLOT N-1 |
|---|---|---|---|---|
| PPTx | PPTj | PPTk | ... | PPTz |

FIG. 6A

L2P CHANGELOG 645

| ENTRY 0 | ENTRY 1 | ... | ENTRY K-1 |
|---|---|---|---|
| (LBAi, Phyi) | (LBAu, Phyu) | ... | (LBAc, Phyc) |

FIG. 6B

HYBRID LOGICAL TO PHYSICAL CACHING SCHEME

PRIORITY APPLICATION

This application claims the benefit of priority under 35 U.S.C. 119(e) from U.S. Provisional Application Ser. No. 62/787,043, filed 31 Dec. 2018, which application is incorporated herein by reference in its entirety.

BACKGROUND

Memory devices are typically provided as internal, semiconductor, integrated circuits in computers or other electronic devices. There are many different types of memory, including volatile and non-volatile memory. Volatile memory requires power to maintain its data, and examples of volatile memory include random-access memory (RAM), dynamic random-access memory (DRAM), and synchronous dynamic random-access memory (SDRAM), among others. Non-volatile memory can retain stored data when not powered, and examples of non-volatile memory include flash memory, read-only memory (ROM), electrically erasable programmable ROM (EEPROM), erasable programmable ROM (EPROM), resistance variable memory, such as phase-change random-access memory (PCRAM), resistive random-access memory (RRAM), and three-dimensional (3D) XPoint™ memory, among others.

Flash memory is utilized as non-volatile memory for a wide range of electronic applications. Flash memory devices typically include one or more groups of one-transistor, floating gate or charge trap memory cells that allow for high memory densities, high reliability, and low power consumption. Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the memory cells in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner that is unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. Unless otherwise clearly indicated by express language or context, MLC is used herein in its broader context, to can refer to any memory cell that can store more than one bit of data per cell (i.e., that can represent more than two programmed states).

Traditional memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory devices, are being developed to further increase memory density and lower memory cost.

Such 3D NAND devices often include strings of storage cells, coupled series (e.g., drain to source), between me or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) may extend adjacent a string of storage cells to form a channel for the storage cells of the string. In the example of a vertical string, the polysilicon structure may be in the form of a vertically extending pillar. In some examples, the string may be "folded," and thus arranged relative to a U-shaped pillar. In other examples, multiple vertical structures may be stacked upon one another to form stacked arrays of storage cell strings.

Memory arrays or devices can be combined together to form a storage volume of a memory system, such as a solid-state drive (SSD), a Universal Flash Storage (UFS™) device, a MultiMediaCard (MMC) solid-state storage device, an embedded MMC device (eMMC™), etc. An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells, to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs may include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations, to transfer data (e.g., user data and associated integrity data, such as error data and address data, etc.) between the memory devices and the host, or erase operations to erase data from the memory devices.

In NAND flash-based storage systems, user data stored in a NAND memory device can be written to an address by a host, such as a host processor or processors, where a logical block address (LBA) can be provided as the address. The LBA reflects information of the location of user data from a perspective of the host. The user data is stored in NAND memory devices according to physical addresses. A logical to physical (L2P) mapping can be maintained by the storage system to map blocks of LBAs to physical addresses. At least some of this mapping can be maintained in random access memory (RAM). In a managed NAND environment, such as UFS and eMMC, using this mapping may include using a large amount of RAM storage space and increasing processing time, cost, and power consumption.

BRIEF DESCRIPTION OF THE DRAWINGS

The drawings, which are not necessarily drawn to scale, illustrate generally, by way of example, but not by way of limitation, various embodiments discussed in the present document.

FIG. 6A shows a representation of an example of a logical to physical cache, according to various embodiments.

FIG. 6B shows a representation of an example of a logical physical changelog, according to various embodiments.

DETAILED DESCRIPTION

Figure 1:
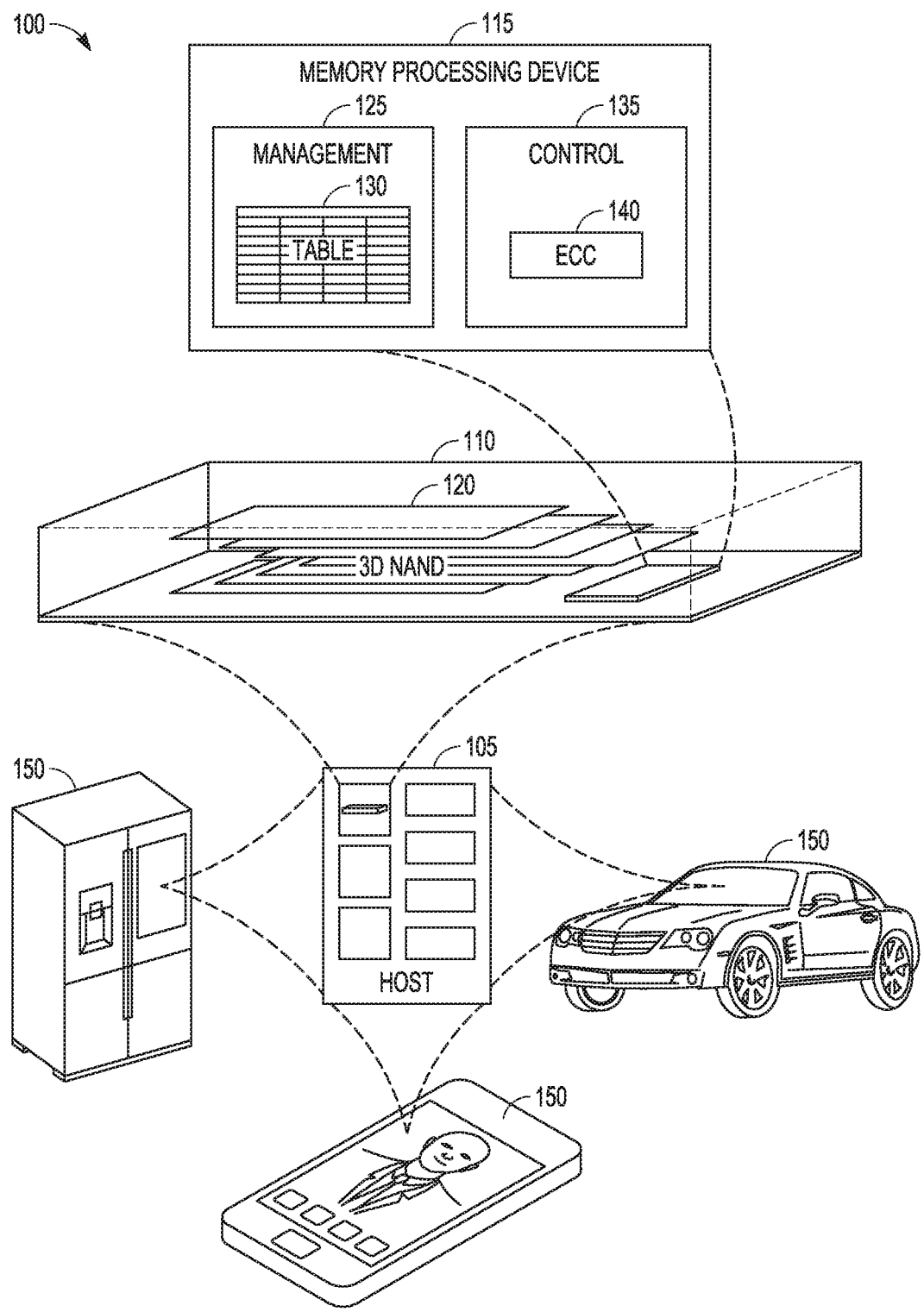
FIG. 1 illustrates an example of an environment including a memory device, according to various embodiments.

The following detailed description refers to the accompanying drawings that show, by way of illustration and not limitation, various embodiments in which an invention can be practiced. These embodiments are described in sufficient detail to enable those skilled in the art to practice these and other embodiments. Other embodiments may be utilized, and structural, logical, mechanical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

A memory system can be configured to maintain a set of L2P pointers. An L2P pointer relates a physical address at a memory array of the memory system to a logical address used by one or more hosts. L2P pointers can be stored in RAM of the memory system. Read and write requests can include a logical address associated with a data unit to be read or written.

In some approaches, a memory system is configured to cache portions of a L2P table including L2P pointers. When making a read request at a logical address, a determination can be made as to whether a copy of the L2P pointer corresponding to that logical address is cached. If the memory has a cached copy of the L2P pointer, it can use the L2P pointer to resolve the physical address at the memory system that corresponds to the logical address. Thus, performance of a NAND storage device is heavily influenced by L2P hit rate of the cache.

In a deep embedded managed memory system, there can be reduced RAM memory resources that do not allow all of the array of physical address for each LBA to be cached. For such a memory system, L2P cache management can be important. Some architectural solutions to address limited RAM memory can include two L2P areas of RAM: an L2P cache area in the RAM and a L2P changelog area in the RAM. An L2P changelog is an array of pairs (LBA, Physical Address) updated with write commands. For each write operation, a LBA, Physical Address pair can be added to the L2P changelog to update the L2P changelog. For read operations, a page pointer table (PPT), which can be arranged as an array of physical addresses, can be loaded in the L2P cache to access the data in a NAND memory device. These previous architectural solutions were based on using only an L2P cache area or both L2P cache and L2P changelog areas, both with write operations only using access in the L2P changelog.

In various embodiments, a L2P cache area can be progressively configured with the most frequently accessed PPTs, which can be referred to as L2P chunks, considering the latest host access of the memory system. By configuring the most frequently accessed PPTs based on latest access by the host, the L2P cache hit rate can be increased. In a system with limited RAM resources, this approach improves the L2P cache hit rate to reduce latency due to L2P chunks loaded from a NAND of the memory system. The term to load can also be referred to as to flush.

A hybrid approach can use both the L2P cache and the L2P changelog in RAM to progressively configure the L2P cache with the most frequently assessed L2P chunks. Such a hybrid approach can be based on identifying the hottest PPTs during a changelog update to load them in the L2P cache area in place of the coldest PPTs. Loading a PPT from the L2P changelog to the L2P cache is a promotion of the PPT to the L2P cache. Hottest PPTs are the most frequently accessed PPTs in the latest host operations. Coldest PPTs are PPTs in L2P cache with low access in the latest host operations. The time interval associated with host operations, such as write operations to define hot and cold status, can be set by firmware and can be modified.

Such a hybrid approach can be based on both access of the L2P cache and the L2P changelog for both write and read operations, choosing the most appropriate L2P area for a given operation, depending on the recent host behavior. Such an approach can help to configure the limited RAM memory for the L2P chunks to improve performance in both sequential and random operations in a range of PPTs, which is not found in other approaches.

Electronic devices, such as mobile electronic devices (e.g., smart phones, tablets, etc.), electronic devices for use in automotive applications (e.g., automotive sensors, control units, driver-assistance systems, passenger safety or comfort systems, etc.), and Internet-connected appliances or devices (e.g., internet-of-things (IoT) devices, etc.), have varying storage needs depending on, among other things, the type of electronic device, use environment, performance expectations, etc.

Electronic devices care be broken down into several main components: a processor (e.g., a central processing unit (CPU) or other main processor); memory (e.g., one or more volatile or non-volatile random-access memory (RAM) memory device, such as dynamic RAM (DRAM), mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly, etc.). In certain examples, electronic devices can include a user interface (e.g., a display, touchscreen, keyboard, one or more buttons, etc.), a graphics processing unit (GPU), a power management circuit, a baseband processor or one or more transceiver circuits, etc.

FIG. 1 illustrates an example of an environment 100 including a host device 105 and a memory device 110 configured to communicate over a communication interface. The host device 105 or the memory device 110 may be included in a variety of products 150, such as Internet of Things (IoT) devices (e.g., a refrigerator or other appliance, sensor, motor or actuator, mobile communication device, automobile, drone, etc.) to support processing, communications, or control of the product 150.

The memory device 110 includes a memory processing device 115 and a memory array 120 including, for example, a number of individual memory die (e.g., a stack of three-dimensional (3D) NAND die). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105.

One or more communication interfaces can be used to transfer data between the memory device 110 and one or more other components of the host device 105, such as a Serial Advanced Technology Attachment (SATA) interface, a Peripheral Component interconnect Express (PCIe) interface, a Universal Serial Bus (USB) interface, a Universal Flash Storage (UFS) interface, an eMMC™ interface, or one or more other connectors or interfaces. The host device 105 can include a host system, an electronic device, a processor, a memory card reader, or one or more other electronic devices external to the memory device 110. In some examples, the host device 105 may be a machine having some portion, or all, of the components discussed in reference to the machine 500 of FIG. 5.

The memory processing device 115 can receive instructions from the host device 105, and can communicate with the memory array 120, such as to transfer data to (e.g., write or erase) or from (e.g., read) one or more of the memory cells, planes, sub-blocks, blocks, or pages of the memory array 120. The memory processing device 115 can include, among other things, circuitry or firmware, including one or more components or integrated circuits. For example, the memory processing device 115 can include one or more memory control units, circuits, or components configured to control access across the memory array 120 and to provide a translation layer between the host device 105 and the memory device 110. The memory processing device 115 can include one or more input/output (I/O) circuits, lines, or interfaces to transfer data to or from the memory array 120. The memory processing device 115 can include a memory manager 125 and an array controller 135.

The memory manager 125 can include, among other things, circuitry or firmware, such as a number of components or integrated circuits associated with various memory management functions. For purposes of the present description, example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more component of the memory device 110 (e.g., various information associated with a memory array or one or more memory cells coupled to the memory processing device 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory processing device 115. In certain examples, if the number of detected errors for one or more of the error counts is above a threshold, the bit error can be referred to as an uncorrectable bit error. The management tables 130 can maintain a count of correctable or uncorrectable bit errors, among other things.

The array controller 135 can include, among other things, circuitry or components configured to control memory operations associated with writing data to, reading data from, or erasing one or more memory cells of the memory device 110 coupled to the memory processing device 115. The memory operations can be based on, for example, host commands received from the host device 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory processing device 115. The memory processing device 115 can be configured to actively detect and recover from error occurrences (e.g., bit errors, operation errors, etc.) associated with various operations or storage of data, while maintaining integrity of the data transferred between the host device 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors.

The memory array 120 can include several memory cells arranged in, for example, a number of devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

In operation, data is typically written to or read from the NAND memory device 110 in pages and erased in blocks. However, one or more memory operations (e.g., read, write, erase, etc.) can be performed on larger or smaller groups of memory cells, as desired. The data transfer size of a NAND memory device 110 is typically referred to as a page; whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes or may require different amounts of metadata associated therewith. For example, different memory device types may have different hit error rates, which can lead to different amounts of metadata necessary to ensure integrity of the page of data (e.g., a memory device with a higher hit error rate may require more bytes of error correction code data than a memory device with a lower hit error rate). As an example, a multi-level cell (MLC) NAND flash device may have a higher bit error rate than a corresponding single-level cell (SLC) NAND flash device. As such, the MLC device may require more metadata bytes for error data than the corresponding SLC device.

Figure 2:
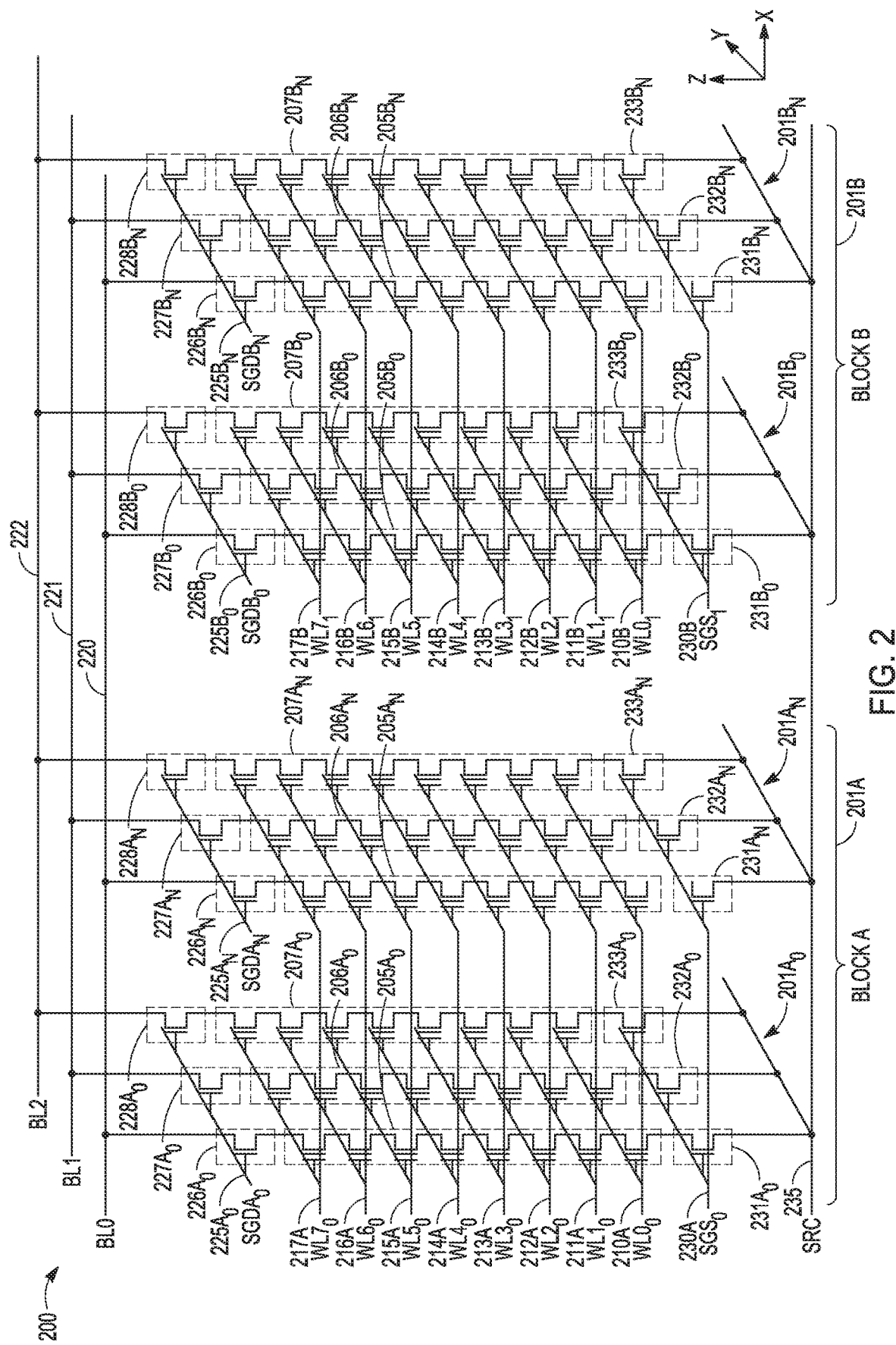
FIGS. 2 and 3 illustrate schematic diagrams of an example of a three-dimensional NAND architecture semiconductor memory array, according to various embodiments.

FIG. 2 illustrates an example schematic diagram of a 3D NAND architecture semiconductor memory array 200 including a number of strings of memory cells (e.g., first-third $A_0$ memory strings 205$A_0$-207$A_0$, first-third $A_n$ memory strings 205$A_n$-207$A_n$, first-third $B_0$ memory strings 205$B_0$-207$B_0$, first-third $B_n$ memory strings 205$B_n$-207$B_n$, etc.), organized in blocks (e.g., block A 201A, block B 201B, etc.) and sub-blocks (e.g., sub-block $A_0$ 201$A_0$, sub-block $A_n$ 201$A_n$, sub-block $B_0$ 201$B_0$, sub-block $B_n$ 201$B_n$, etc.). The memory array 200 represents a portion of a greater number of similar structures than would typically be found in a block, device, or other unit of a memory device.

Each string of memory cells includes a number of tiers of charge storage transistors (e.g., floating gate transistors, charge-trapping structures, etc.) stacked in the Z direction, source to drain, between a source line (SRC) 235 or a source-side select gate (SGS) (e.g., first-third $A_0$ SGS 231$A_0$-233$A_0$, first-third $A_n$ SGS 231$A_n$-233$A_n$, first-third $B_0$ SGS 231$B_0$-233$B_0$, first-third $B_n$ SGS 231$B_n$-233$B_n$, etc.) and a drain-side select gate (SGD) (e.g., first-third $A_0$ SGD 226$A_0$-228$A_0$, first-third $A_n$ SGD 226$A_n$-228$A_n$, first-third $B_0$ SGD 226$B_0$-228$B_0$, first-third $B_n$ SGD 226$B_n$-228$B_n$, etc.). Each string of memory cells in the 3D memory array can be arranged along the X direction as data lines (e.g., bit lines (BL) BL0-BL2 220-222), and along the Y direction as physical pages.

Within a physical page, each tier represents a row of memory cells, and each string of memory cells represents a column. A sub-block can include one or more physical pages. A block can include a (lumber of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 200 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the charge storage transistors (e.g., select gates, data lines, etc.), as desired. As an example, a 48 GB TLC NAND memory device can include 18,592 bytes (B) of data per page (16,384+2208 bytes), 1536 pages per block, 548 blocks per plane, and 4 or more planes per device.

Each memory cell in the memory array 200 includes a control gate (CG) coupled to (e.g., electrically or otherwise operatively connected to) an access line (e.g., word lines (WL) WL$0_0$-WL$7_0$ 210A-217A, WL$0_1$-WL$7_1$ 210B-217B, etc.), which collectively couples the control gates (CGs) across a specific tier, or a portion of a tier, as desired. Specific tiers in the 3D memory array, and accordingly, specific memory cells in a string, can be accessed or controlled using respective access lines. Groups of select gates can be accessed using various select lines. For example, first-third $A_0$ SGD 226$A_0$-228$A_0$ can be accessed using an $A_0$ SGD line SGDA$_n$, 225$A_0$, first-third $A_n$ SGD 226$A_n$-228$A_n$ can be accessed using an $A_n$ SGD line SGDA$_n$ 225$A_n$, first-third $B_0$ SGD 226$B_0$-228$B_0$ can be accessed using an $B_0$ SGD line SGDB$_0$ 225$B_0$, and first-third $B_n$ SGD 226$B_n$-228$B_n$ can be accessed using an $B_n$ SGD line SGDB$_n$ 225$B_n$. First-third $A_0$ SGS 231$A_0$-233$A_0$ and first-third $A_n$ SGS 231$A_n$-233$A_n$ can be accessed using a gate select line SGS$_0$ 230A, and first-third $B_0$ SGS 231$B_0$-233$B_0$ and first-third $B_n$ SGS 2319$_n$-233$B_n$ can be accessed using a gate select line SGS$_1$ 230B.

In an example, the memory array 200 can include a number of levels of semiconductor material (e.g., polysilicon, etc.) configured to couple the control gates (CGs) of each memory cell or select gate (or a portion of the CGs or select gates) of a respective tier of the array. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

Figure 3:
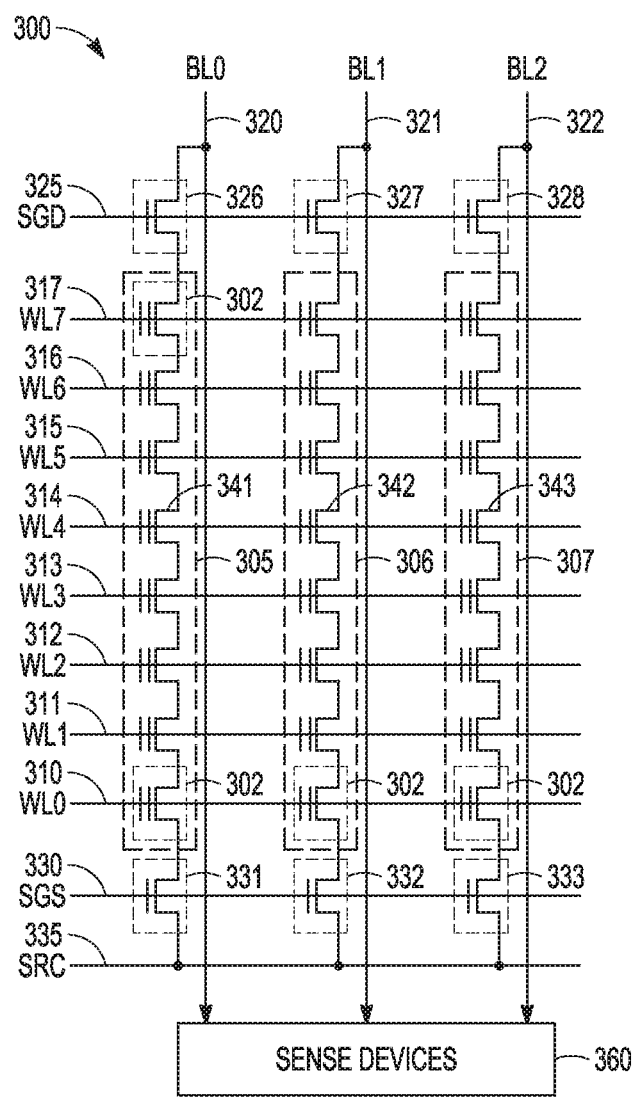

FIG. 3 illustrates an example schematic diagram of a portion of a NAND architecture semiconductor memory array 300 including a plurality of memory cells 302 arranged in a two-dimensional array of strings (e.g., first-third strings 305-307) and tiers (e.g., illustrated as respective word lines (WL) WL0-WL7 310-317, a drain-side select gate (SGD) line 325, a source-side select gate (SGS) line 330, etc.), and sense amplifiers or devices 360. For example, the memory array 300 can illustrate an example schematic diagram of a portion of one physical page of memory cells of a 3D NAND architecture semiconductor memory device, such as illustrated in FIG. 2.

Each string of memory cells is coupled to a source line (SRC) 335 using a respective source-side select gate (SGS) (e.g., first-third SGS 331-333), and to a respective data line (e.g., first-third bit lines (BL) BL0-BL2 320-322) using a respective drain-side select gate (SGD) (e.g., first-third SGD 326-328). Although illustrated with 8 tiers (e.g., using word lines (WL) WL0-WL7 310-317) and three data lines (BL0-131-2 326-328) in the example of FIG. 3, other examples can include strings of memory cells having more or fewer tiers or data lines, as desired.

In a NAND architecture semiconductor memory array, such as the example memory array 300, the state of a selected memory cell 302 can be accessed by sensing a current or voltage variation associated with a particular data line containing the selected memory cell. The memory array 300 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7) or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., WL4), and thus, to a control gate of each memory cell coupled to the selected word lines (e.g., first-third control gates (CGs) 341-343 of the memory cells coupled to WL4). Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as WL4, a pass voltage of 10V can be applied to one or more other word lines, such as WL3, WL5, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to WL4, a pass voltage of 10V can be applied to WL3 and WL5, a pass voltage of 8V can be applied to WL2 and WL6, a pass voltage of 7V can be applied to WL1 and WL7, etc. In other examples, the pass voltages, or number of word lines, etc., can be higher or lower, or more or less.

The sense devices 360, coupled to one or more of the data lines (e.g., first, second, or third bit lines (BL0-BL2) 320-322), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

To erase a memory cell or a group of memory cells (e.g., erasure is typically performed in blocks or sub-blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or Fowler-Nordheim (FN) tunneling, etc.) from the floating gates of the targeted memory cells to the channels.

Figure 4:
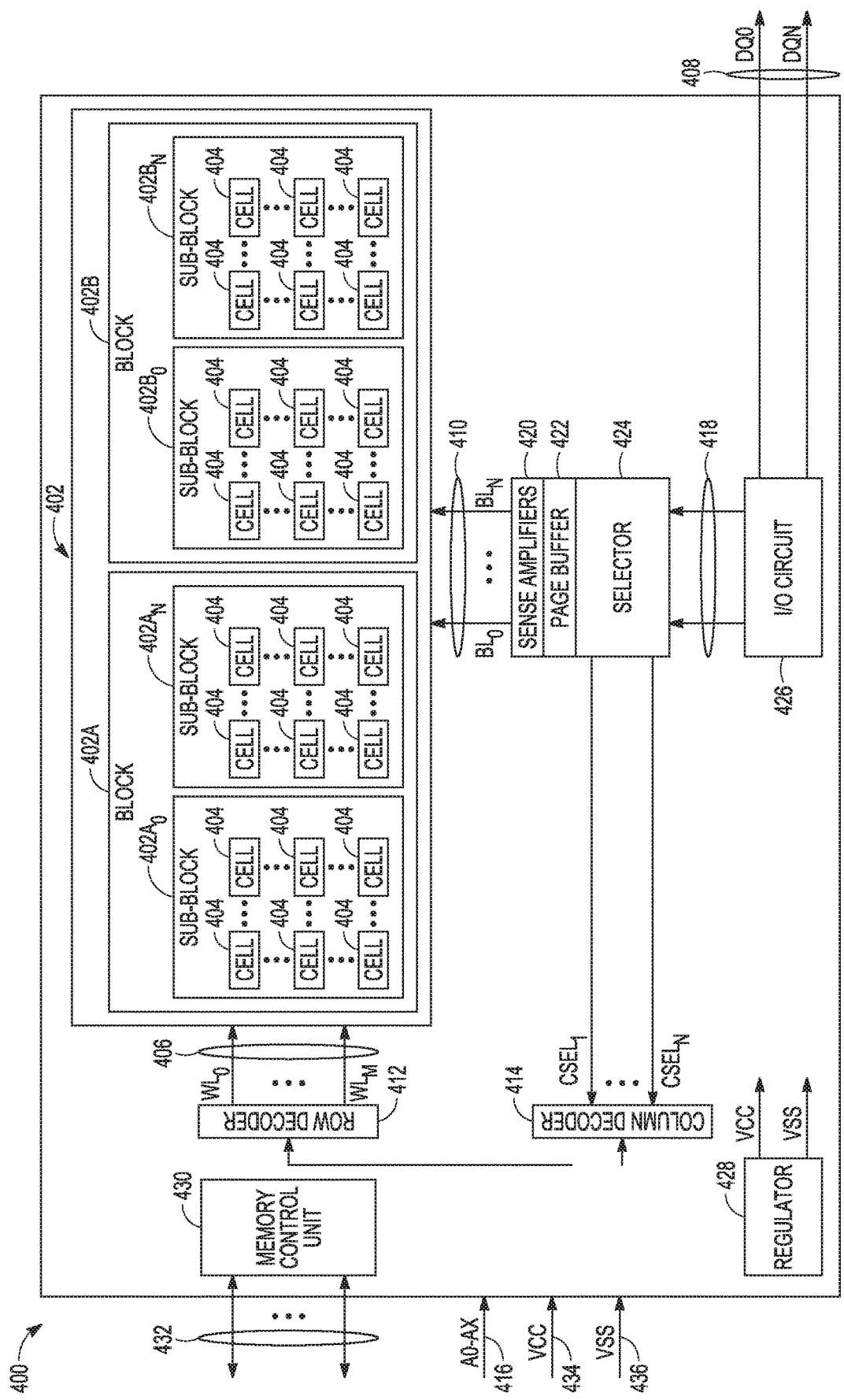
FIG. 4 illustrates an example block diagram of a memory module, according to various embodiments.

FIG. 4 illustrates an example block diagram of a memory device 400 including a memory array 402 having a plurality of memory cells 404, and one or more circuits or components to provide communication with, or perform one or more memory operations on, the memory array 402. The memory device 400 can include a row decoder 412, a column decoder 414, sense amplifiers 420, a page buffer 422, a selector 424, an input/output (I/O) circuit 426, and a memory control unit 430.

The memory cells 404 of the memory array 402 can be arranged in blocks, such as first and second blocks 402A, 402B. Each block can include sub-blocks. For example, the first block 402A can include first and second sub-blocks 402A$_0$, 402A$_n$, and the second block 402B can include first and second sub-blocks 402B$_0$, 402B$_n$. Each sub-block can include a number of physical pages, each page including a number of memory cells 404. Although illustrated herein as having two blocks, each block having two sub-blocks, and each sub-block having a number of memory cells 404, in other examples, the memory array 402 can include more or fewer blocks, sub-blocks, memory cells, etc. In other examples, the memory cells 404 can be arranged in a number of rows, columns, pages, sub-blocks, blocks, etc., and accessed using, for example, access lines 406, first data lines 410, or one or more select gates, source lines, etc.

The memory control unit 430 can control memory operations of the memory device 400 according to one or more signals or instructions received on control lines 432, including, for example, one or more clock signals or control signals that indicate a desired operation (e.g., write, read, erase, etc.), or address signals (A0-AX) received on one or more address lines 416. One or more devices external to the memory device 400 can control the values of the control signals on the control lines 432, or the address signals on the address line 416. Examples of devices external to the memory device 400 can include, but are not limited to, a host, a memory controller, a processor, or one or more circuits or components not illustrated in FIG. 4.

The memory device 400 can use access lines 406 and first data lines 410 to transfer data to (e.g., write or erase) or from (e.g., read) one or more of the memory cells 404. The row decoder 412 and the column decoder 414 can receive and decode the address signals (A0-AX) from the address line 416, can determine which of the memory cells 404 are to be accessed, and can provide signals to one or more of the access lines 406 (e.g., one or more of a plurality of word lines (WL0-WLm)) or the first data lines 410 (e.g., one or more of a plurality of bit lines (BL0-BLn)), such as described above.

The memory device 400 can include sense circuitry, such as the sense amplifiers 420, configured to determine the values of data on (e.g., read), or to determine the values of data to be written to, the memory cells 404 using the first data lines 410. For example, in a selected string of memory cells 404, one or more of the sense amplifiers 420 can read a logic level in the selected memory cell 404 in response to a read current flowing in the memory array 402 through the selected string to the data lines 410.

One or more devices external to the memory device 400 can communicate with the memory device 400 using the I/O lines (DQ0-DQN) 408, address lines 416 (A0-AX or control lines 432. The input/output (I/O) circuit 426 can transfer values of data in or out of the memory device 400, such as in or out of the page buffer 422 or the memory array 402, using the I/O lines 408, according to, for example, the control lines 432 and address lines 416. The page buffer 422 can store data received from the one or more devices external to the memory device 400 before the data is programmed into relevant portions of the memory array 402 or can store data read from the memory array 402 before the data is transmitted to the one or more devices external to the memory device 400.

The column decoder 414 can receive and decode address signals (A0-AX) into one or more column select signals (CSEL1-CSELn). The selector 424 (e.g., a select circuit) receive the column select signals (CSEL1-CSELn) and select data in the page buffer 422 representing values of data to be read from or to be programmed into memory cells 404. Selected data can be transferred between the page buffer 422 and the I/O circuit 426 using second data lines 418.

The memory control unit 430 can receive positive and negative supply signals, such as a supply voltage (Vcc) 434 and a negative supply (Vss) 436 (e.g., a ground potential), from an external source or supply (e.g., an internal or external battery, an AC-to-DC converter, etc.). In certain examples, the memory control unit 430 can include a regulator 428 to internally provide positive or negative supply signals.

Figure 5:
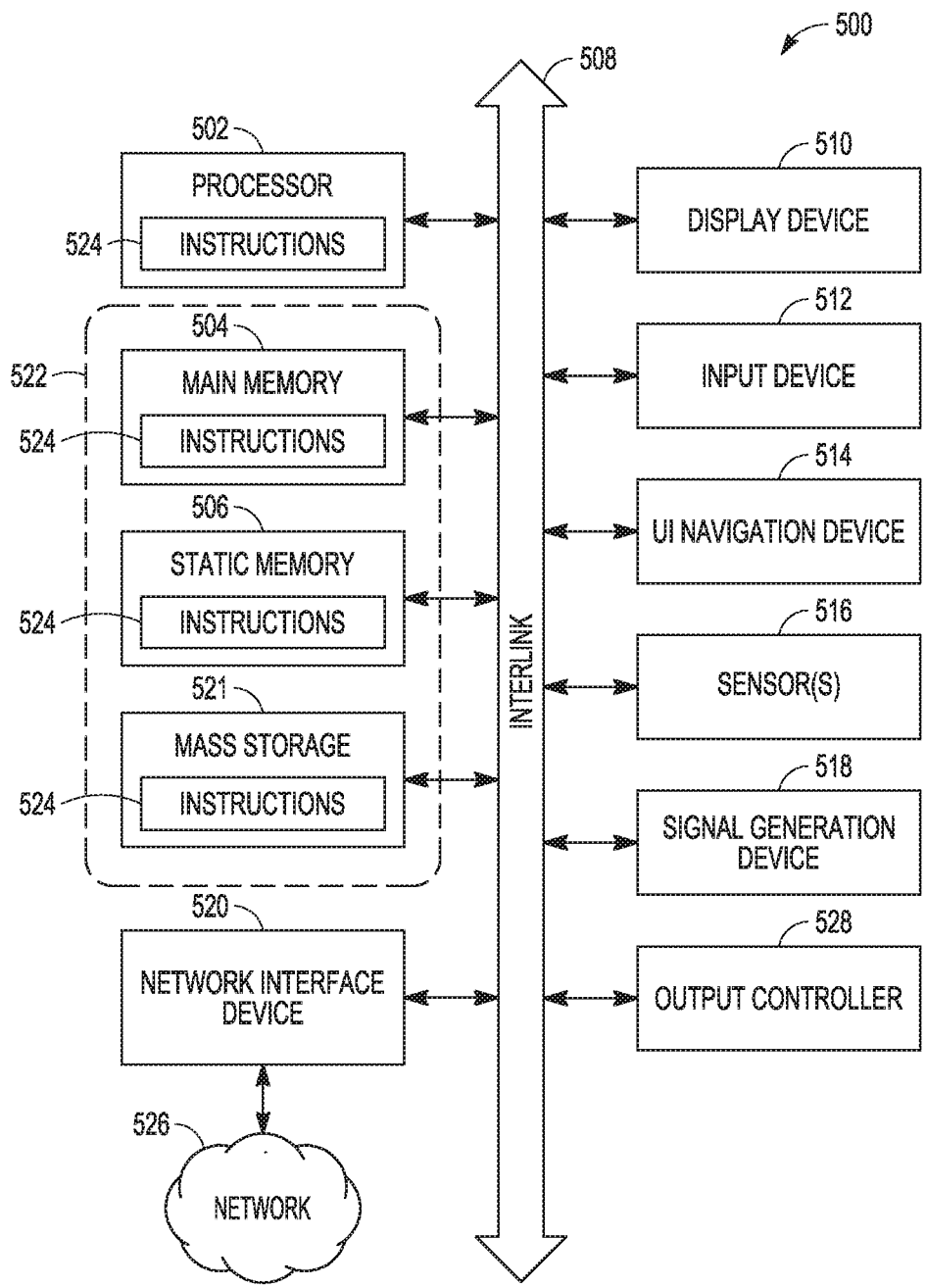
FIG. 5 is a block diagram illustrating an example of a machine upon which one or more embodiments may be implemented, according to various embodiments.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 500 (e.g., the host device 105, the memory device 110, etc.) may include a hardware processor 502 (e.g., a central processing unit (CPU), a graphics processing unit (GPU), a hardware processor core, or any combination thereof, such as the memory processing device 115, etc.), a main memory 504 and a static memory 506, some or all of which may communicate with each other via an interlink (e.g., bus) 508. The machine 500 may further include a display device 510, an alphanumeric input device 512 (e.g., a keyboard), and a user interface (UI)

navigation device 514 (e.g., a mouse). In an example, the display device 510, input device 512 and UI navigation device 514 may be a touch screen display. The machine 500 may additionally include a storage device (e.g., drive unit) 521, a signal generation device 518 (e.g., a speaker), a network interface device 520, and one or more sensors 516, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 521 may include a machine-readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 521 may constitute the machine-readable medium 522.

While the machine-readable medium 522 is illustrated as a single medium, the term "machine-readable medium" may include a single medium or multiple media (e.g., a centralized or distributed database, or associated caches and servers) configured to store the one or more instructions 524.

The term "machine-readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 (e.g., software, programs, an operating system (OS), etc.) or other data are stored on the storage device 521, can be accessed by the memory 504 for use by the processor 502. The memory 504 (e.g., DRAM) is typically fast, but volatile, and thus a different type of storage than the storage device 521 (e.g., an SSD), which is suitable for long-term storage, including while in an "off" condition. The instructions 524 or data in use by a user or the machine 500 are typically loaded in the memory 504 for use by the processor 502. When the memory 504 is full, virtual space from the storage device 521 can be allocated to supplement the memory 504; however, because the storage device 521 is typically slower than the memory 504, and write speeds are typically at least twice as slow as read speeds, use of virtual memory can greatly reduce user experience due to storage device latency (in contrast to the memory 504, e.g., DRAM). Further, use of the storage device 521 for virtual memory can greatly reduce the usable lifespan of the storage device 521.

In contrast to virtual memory, virtual memory compression (e.g., the Linux® kernel feature "ZRAM") uses part of the memory as compressed block storage to avoid paging to the storage device 521. Paging can take place in the compressed block until it is time to write such data to the storage device 521. Virtual memory compression increases the usable size of memory 504, while reducing wear on the storage device 521.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission signal" shall be taken to include any signal that is capable of storing, encoding, or carrying instructions for execution by the machine 500, and includes digital or analog communications signals or other signals to facilitate communication of such software.

FIG. 6A shows a representation of an embodiment of an example of a L2P cache 640. The L2P cache 640 can be arranged in RAM as one of two L2P areas in the RAM, which RAM can be used as a cache for write and read operations, such as associated with a managed memory system. The L2P cache 640 can be arranged as a RAM area divided in slots of PPTs. For example, the L2P cache 640 can be arranged into N slots, numbered slot 0, slot 1, slot 2 . . .

slot N−1 with each slot having a PPT. In this example, slot 0 contains PPTx, slot 1 contains PPTj, slot 2 contains PPT k, and each slot, following slot 2, contains a PPT to slot N−1 that contains PPTx. The PPTs can be allocated an amount of memory size. For example, a PPT can be structured as a chunk of 4 KB size containing 1K Physical Addresses of 4 B each. Other sizes may be used for a PPT.

FIG. 6B shows a representation of an embodiment of an example of a L2P changelog 645. The L2P changelog 645 can be arranged in another area of RAM as an array of pairs of an LBA with its associated physical address. For example, the L2P changelog 645 can include K number of entries: entry 0, entry 1 . . . entry K−1 with each entry containing a (LBA, Physical Address) pair. Entry 0 contains (LBAi, Physical Address i) pair, entry 1 contains (LBAu, Physical Address u) pair, and each entry, following entry 1, contains a (LBA, Physical Address) pair to entry K−1 that contains (LBAc, Physical Address c) pair. The array of pairs can be allocated an amount of memory size. For example, the array of pairs can be structured as 4K entries of 8B (4B+4B). Other sizes may be used for an array of pairs.

An L2P hybrid approach can be used with L2P updates associated with write operations. In case of write operations, a procedure can be executed that does not use only a L2P changelog, such as L2P changelog 645. In a case in which a target PPT in the L2P cache 640 is dirty, the target PPT can be updated in the L2P cache 640 with the new address information of the data of the current write operation. Otherwise, the L2P changelog 645 can be updated with the new address information. Dirty means that data is modified compared to the version stored.

When a given PPT in the L2P cache 640 becomes dirty, which indicates that it is modified, it cannot be swapped out from the L2P cache 640 with another PPT to load in the L2P cache 640 before flushing the given PPT to the NAND. The given PPT can be flushed to the NAND before the given PPT is overwritten in the L2P cache 640 by the new PPT.

In an L2P hybrid approach to a write operation that can include access of the L2P cache, a status of the PPT of the write operation can be considered. An PPT can have a hot status or a cold status. A PPT is hot, that it has a hot status, if there is a high frequency of accesses to the PPT in a latest time interval by a host. A PPT is cold, that it has a cold status, if there are no accesses in the latest time interval by a host. The time interval can be the latest time performed by the host in a data access operation. This time interval can be set by firmware.

A L2P hybrid approach can be implemented to improve sequential write operations. This improvement can be achieved by reducing the amount of times that the L2P changelog 645 fills up, where the reduction can be accomplished by loading the L2P cache 640. When the L2P changelog 645 fills up, all the PPTs of the L2P cache 640 that are modified during the latest write operation are updated. With some PPTs directly updated in the L2P cache 640, the amount of times the changelog 645 fills up can be reduced.

A L2P hybrid approach can be implemented to improve a random read. A random read can be improved by avoiding L2P changelog 645 access by using L2P cache 640 access in place of changelog access. If a PPT has been loaded in the L2P cache 640 for a write operation, this PPT is already loaded for a read operation following the write operation. With this occurrence, access of the L2P changelog 645 for the read operation can be avoided. This mechanism avoids performance of a search in the L2P changelog 645 for the (LBA, Physical Address) pair, because access can go directly to the L2P cache 640 to find the LRA hit by the read.

Increasing the hit rate on the L2P cache 640 for write and read operations can improve performance by reducing time to perform functions associated with the write and read operations. The L2P cache area can be progressively configured with the most frequently accessed PPTs in the latest host access operations. This controlling of the configuration of the L2P cache area can increase the L2P cache hit rate, that is, the accesses can be made to the L2P cache instead of the L2P changelog to reduce the searching in the L2P changelog.

Figure 7:
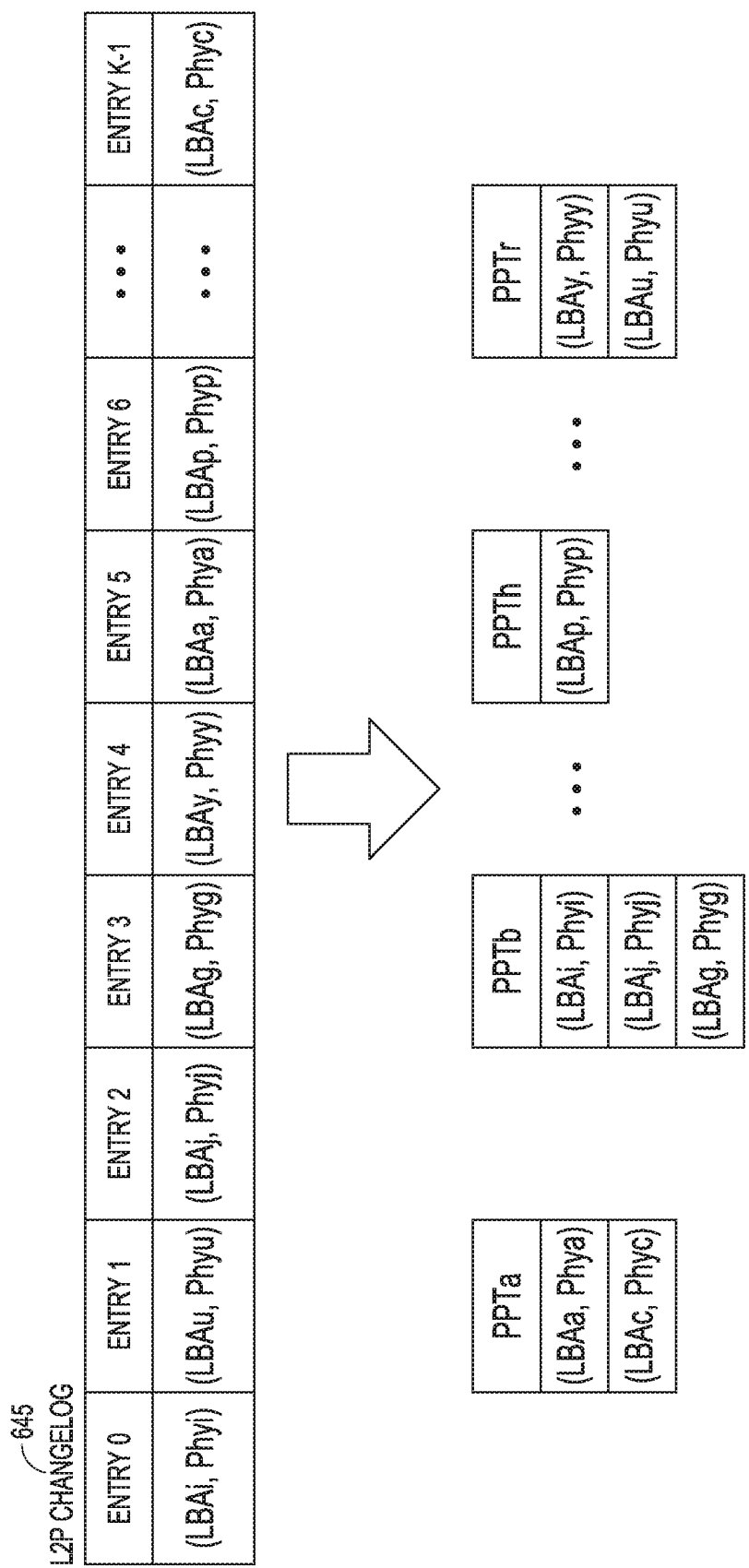
FIG. 7 is an illustration of an example of a logical to physical changelog clustering, according to various embodiments.

FIG. 7 is an illustration of an embodiment of an example of L2P changelog clustering. A list for each PPT to be modified, providing a dedicated changelog, can be instantiated. For example, the L2P changelog 645 of FIG. 6B can be operated on to instantiate a number of lists. FIG. 7 shows the L2P changelog 645 of FIG. 63 expanded with entry 0 containing (LBAi, Physical Address i) pair, entry 1 containing (LBAu, Physical Address u) pair, entry 2 containing (LBAj, Physical Address j) pair, entry 3 containing (LBAg, Physical Address g) pair, entry 4 containing (LBAy, Physical Address y) pair, entry 5 containing (LBAa, Physical Address a) pair, and entry 6 containing (LBAp, Physical Addressp) pair, where the entries end with entry K−1 containing (LBAc, Physical Address c) pair. These entries can be instantiated into a set of lists, where the set contains lists defined by PPTa, PPTb, PPTh, PPTr and so on. In this example of L2P changelog clustering, the PPTa list includes the (LBAa, Physical Address a) pair and the (LBAc, Physical Address c) pair. The PPTb list includes the (LBAi, Physical Address i) pair, (LBAj, Physical Address j) pair, and the (LBAg, Physical Address p) pair. The PPTh list includes the (LBAp, Physical Address p) pair. The PPTr list includes the (LBAy, Physical Address y) pair and the (LBAu, Physical Address u) pair.

In this clustering, the changelog is modified from a sequential arrangement to a set of lists, where the list can function as buckets. Each bucket effectively provides a smaller changelog than the sequential arrangement of L2P changelog 645 of FIG. 6B. There can be one bucket for each PPT. Each bucket, as demonstrated above, has a set of mappings between the LBA and the Physical Address mapped to the LBA.

During a write operation, update of the L2P changelog 645 can be include the updating of the list of clustered PPTs. In a case in which no list is instantiated for the PPT that is the subject of a write operation, a new list can be instantiated for the subject PPT and the associated element can be added to the subject PPT. In a case in which a list is already instantiated with a PPT that is associated with the subject of a write operation, an element can be added in the PPT list.

Figure 8:
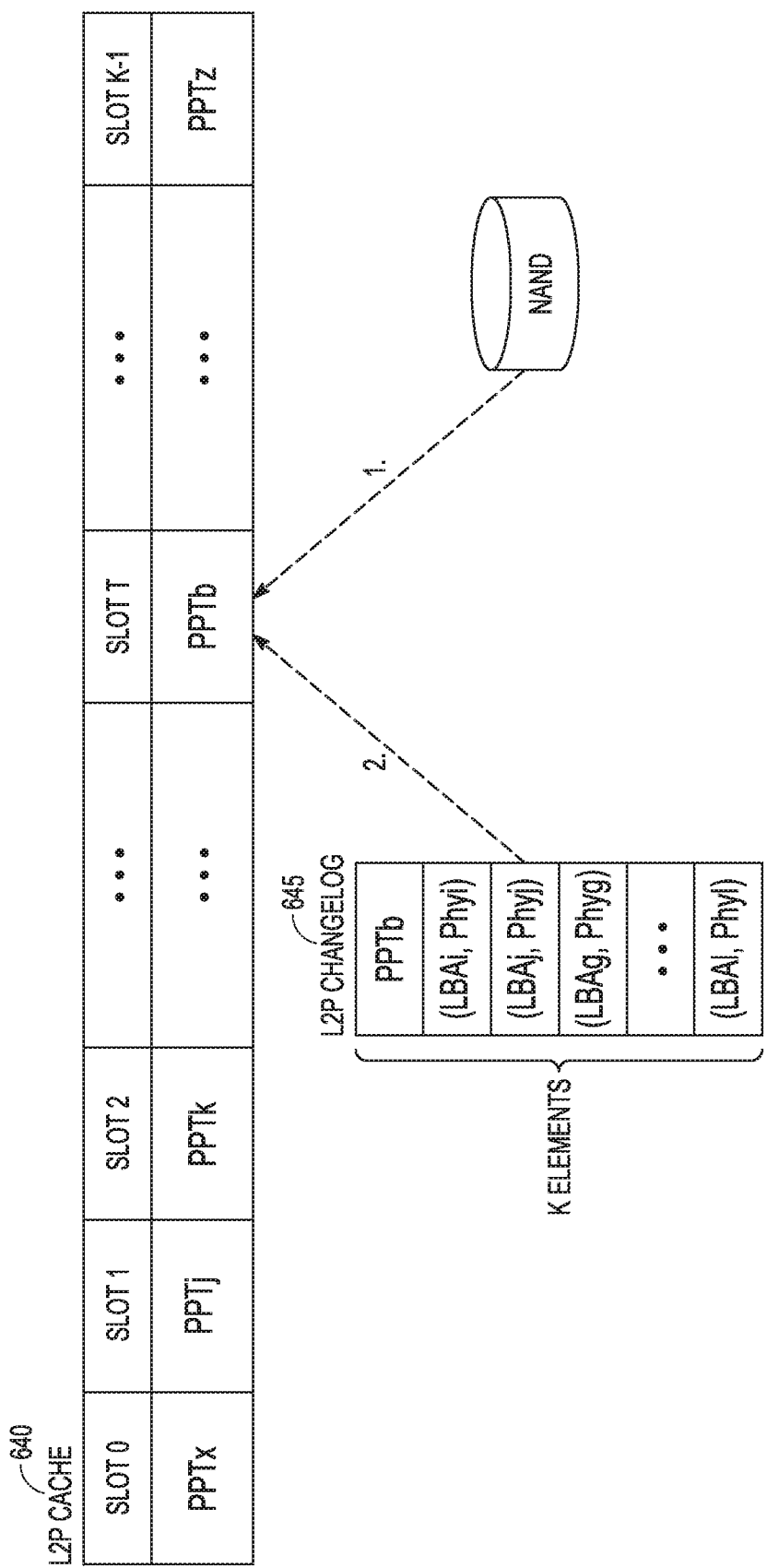
FIG. 8 shows an example of loading a logical to physical changelog when a page pointer table becomes hot, according to various embodiments.

FIG. 8 shows an embodiment of an example of loading the L2P cache 640 when a PPT becomes hot. If a L2P changelog of a PPT, such as PPTb list of L2P changelog 645, fills up quickly, the PPTb becomes hot and can be loaded into L2P cache 640. The fill up parameter can be set in firmware to a number of k elements for the PPTb list. When an element k+1 arrives for the PPTb, the fill up parameter has been exceeded. In response to the arrival of the element k+1, the PPTb can first be loaded from the NAND memory into a slot, for example slot T, of the L2P cache 640. Second, the PPTb can be updated in the L2P cache 640. Third, the bucket for the PPTb list can be set free from the pool of instantiated lists of the L2P changelog 645.

Figure 9:
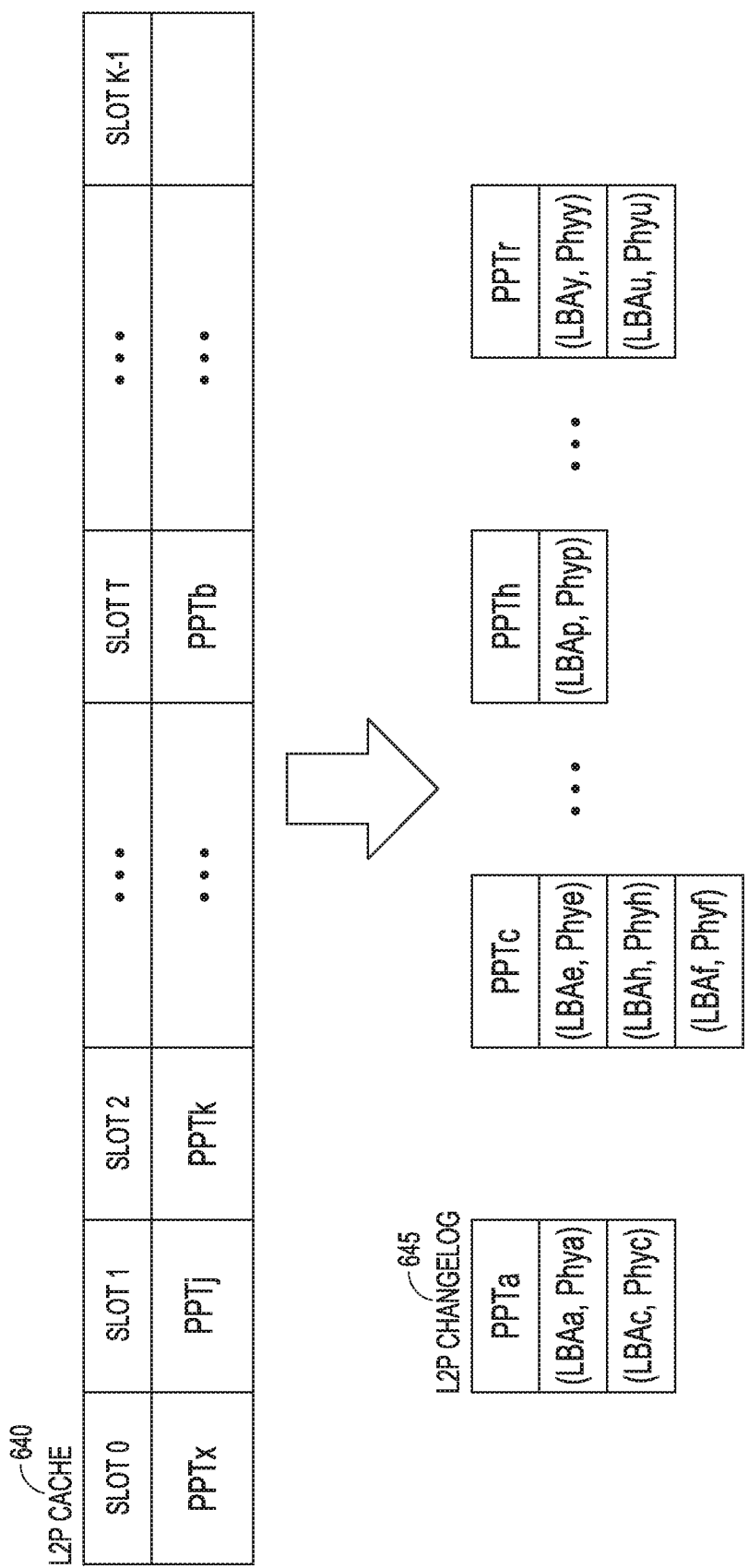
FIG. 9 illustrates a cold status associated with page pointer tables, according to various embodiments.

FIG. 9 illustrates a cold status associated with PPTs. In FIG. 8, the PPTb upon becoming hot was promoted to the L2P cache 640 and removed from the pool of instantiated lists, leaving PPTa, PPTc, PPTh, and PPTr, among other PPTs in the pool of instantiated lists. With PPTa, PPTc, PPTh, and PPTr remaining in the cold status, these PPTs can be in a state in which these PPTs are not promoted to the L2P cache 640. There is a coldness status for each PPT of the L2P cache 640. The coldness can be taken into account to set free some locations in the L2P cache 640 for new PPT loading. A PPT becomes cold when it is not accessed in the latest of the access time by the host. When a PPT is involved with a read or write operation, which effectively heats the PPT, the coldness of the other PPTs can be increased. This provides a PPT coldness index. A counter can be used to determine the coldness by incrementing the counter of a PPT when another PPT is accessed. Other mechanisms can be used to generate a coldness index. When a read or write operation hits a PPT changelog list, the coldness of all the PPTs of the L2P cache 640 can be increased. When a read or write operation hits a PPT of the L2P cache 640, the coldness of all the PPTs in the L2P cache 640 can be increased except for the PTT hit with the read or write operation.

In various embodiments, a hybrid technique for managing L2P mapping can include a swap strategy for PPTs in which the coldest PPTs are swapped out of a L2P cache and the hottest PPTs are swapped into the L2P cache. When a new PPT is to be loaded into a L2P cache slot and there are no free slots, the new PPT can be loaded in the slot of the coldest non-locked PPT. A non-locked PPT is a dirty PPT. If all the slots of the L2P cache are locked, the M coldest PPTs can be identified and flushed to NAND memory to unlock and to make M new slots in the L2P cache available for the new PPTs to be loaded. The parameter M can be chosen to maximize NAND parallelism with respect to channels to access the NAND memory.

In various embodiments, a L2P configuration for access may be progressively reached, which configuration can be directed to a best performance. This progressive approach can be based on the hotness status of PPTs. For sequential operation, as elements are added to each changelog list PPT, the changelog lists fills towards its k number of elements parameter for a filled list. With the increase in the number of elements in the list, the list can quickly become hot. The most accessed PPTs of the pool of changelog lists can be quickly promoted into the L2P cache. This loading allows the promoted PPT to be accessed in the L2P cache instead of the changelog, effectively changing the routing of L2P areas in the RAM. If the changelog does not fill up quickly, a trigger of a checkpoint can be postponed. A checkpoint occurs when the L2P changelog becomes full and consists of loading all the PPTs that are in the L2P changelog into the L2P cache in order to update PPTs and then flush the modified PPTs into the NAND memory. The checkpoint operation is a time consuming operation. Executing features of hybrid approaches to use two L2P areas, as taught herein, the checkpoint can be postponed, because, using the L2P cache instead of using the L2P changelog can reduce the filling of the L2P changelog. This postponement of the checkpoint can increase performance, since occurrence of checkpoint events can become less.

For a random operation, in case of a full random write, changelog lists can almost be empty such that there are no hot PPT buckets. With no hot PPT buckets in the changelog area, no loading and flushing of PPTs are triggered. A checkpoint would be triggered only on a changelog-full event. In case of a full random write on a range of changelog lists, only the PPTs that become progressively hot are loaded in place of the coldest PPTs in the L2P cache. L2P cache area slots can be occupied only by the hot PPTs, which are the most accessed PPTs.

The hybrid use of a L2P cache plus a L2P changelog, as taught herein, can allow for selecting the most opportune of these areas for access. Unlike other approaches that uses only a L2P changelog in write operations and an L2P cache in read operations, the hybrid approach can use both aL2P cache and a L2P changelog in both writes and reads. Selection of the L2P cache area or the L2P changelog area in the hybrid approach can be enabled by clustering of PPTs in the L2P changelog. This clustering can provide for reduction of changelog access time.

Hotness and coldness states of PPTs can be used in the hybrid approach. A PPT hotness detection can be implemented to load PPT during write operation only if the PPT deserves to be loaded. A hot PPT deserves to be loaded, because the PPT becomes hot as it is affected by the host in this current timeframe. These PPTs are to be promoted into the L2P cache with the L2P cache used for accessing the LBA-Physical Address mapping rather than accessing in the change log. Accessing hot PPTs in the changelog can lead to a significant number of updates, which may lead to triggering a checkpoint event. Updating a PPT promoted to the L2P cache instead of conducting the update in the L2P change log may enhance performance.

A coldness flush strategy can approach to flush only the dirty coldest PPTs. This ensures that all PPTs to flush to memory have at least k+1 elements modified. The parameter k provides a parameter related to filling up a changelog list. The parameter k can be considered as being related to time. Consider k elements for a PPT changelog list to fill up, which means that this PPT was operated for a k time equal to k times the largest host access time interval. This coldness flush strategy can also be implemented to ensure maximum NAND parallelism during programming of L2P tables.

The hybrid use of a L2P cache plus a L2P changelog, as taught herein, can allow for a reduction in checkpoint latency, where checkpoint latency is a delay due to operations of checkpoint events over a period of time. As taught herein, the ability to use a L2P cache area and/or a L2P changelog to both write and read operations can provide for a reduction in the amount of times the L2P changelog fills up over a given interval, which can reduce the number of checkpoint events. In addition, some PPTs are already available in the L2P cache with updates to be flushed to the NAND memory, which can provide for checkpoint latency spread. This does not only postpone a checkpoint, but when a checkpoint is performed, it can be performed with more efficient modification for the PPT.

Figure 10:
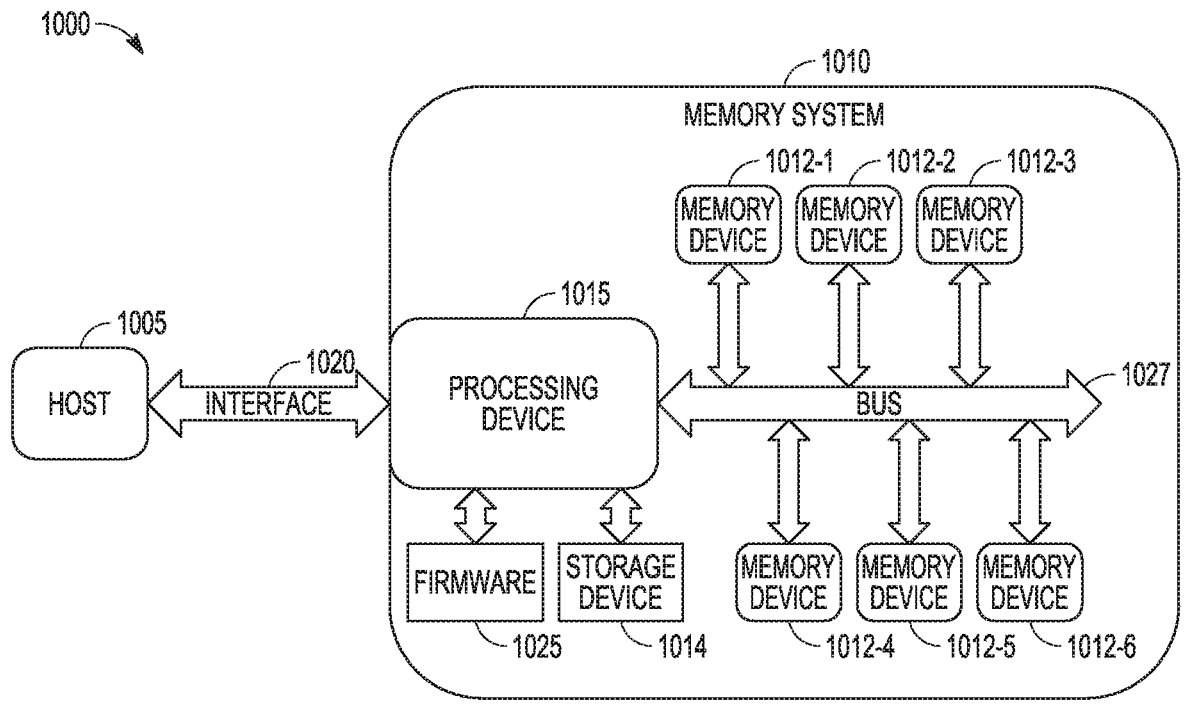
FIG. 10 is a block diagram of an example system including a host that operates with a memory system that uses a hybrid logical to physical caching scheme, according to various embodiments.

FIG. 10 is a block diagram of an embodiment of an example system 1000 including a host 1005 that operates with a memory system 1010 that uses a hybrid logical to physical caching scheme. The host 1005 is coupled to the memory system 1010 by an interface 1020. The memory system 1010 can include a processing device 1015 coupled to memory devices 1012-1, 1012-2, 1012-3, 1012-4, 1012-5, and 1012-6 by a bus 1027. The memory devices 1012-1, 1012-2, 1012-3, 1012-4, 1012-5, and 1012-6 may be NAND memory devices. Though six memory devices are shown in FIG. 10, the memory system 1010 can be implemented with less or more than six memory devices, that is memory system 1010 can comprise one or more memory devices. The memory devices can be realized in a number of formats including but not limited to a plurality of memory dies. The processing device 1015 can include or be structured as one or more processors.

The memory system 1010 can comprise firmware 1025 having code executable by the processing device 1015 to at least manage the memory devices 1012-1, 1012-2, 1012-3, 1012-4, 1012-5, and 1012-6. The firmware 1025 can reside in a storage device of the memory system 1010 coupled to the processing device 1015. The firmware 1025 can be coupled to the processing device 1015 using the bus 1027 or some other interface on the memory system 1010. Alternatively, the firmware 1025 can reside in the processing device 1015 or can be distributed in the memory system 1010 with firmware components, such as but not limited to code, including one or more components in the processing device 1015. The firmware 1025 can include code having instructions, executable by the processing device 1015, to operate on the memory devices 1012-1, 1012-2, 1012-3, 1012-4, 1012-5, and 1012-6. The instructions can include instructions to execute a hybrid logical to physical caching scheme for writes and reads of user data in multiple memory devices of the memory system 1010, as taught herein. The caching scheme scheme can be implemented with two L2P areas: a L2P cache area and a L2P changelog area.

The system 1000 and its components can be structured in a number of different arrangements. For example, the system 1000 can be arranged with a variation of the type of components that comprise the host 1005, the interface 1020, the memory system 1010, the memory devices 1012-1, 1012-2, 1012-3, 1012-4, 1012-5, and 1012-6, the processing device 1015, and the bus 1029. The host 1005 can comprise one or more processors, which can vary in type. The interface 1020 can be arranged as, but not limited to, a peripheral component interconnect express (PCIe) interface. The memory system 1010 can be, but is not limited to, a SSD. The memory devices 1012-1, 1012-2, 1012-3, 1012-4, 1012-5, and 1012-6 can be NAND memory devices. The processing device 1015 can include or be structured as one or more types of processors compatible with the memory devices 1012-1, 1012-2, 1012-3, 1012-4, 1012-5, and 1012-6. The bus 1027 can be an open NAND flash interface (ONFI) bus for the memory devices 1012-1, 1012-2, 1012-3, 1012-4, 1012-5, and 1012-6 being NAND flash memory devices.

A storage device 1014 can be implemented to provide data or parameters used in maintence of the memory system 1010. The storage device 1014 can be arranged to include the two L2P areas: the L2P cache area and the L2P changelog area. A storage device 1014 can include a RAM. Though the storage device 1014 is external to processing device 1015 in memory system 1010 in FIG. 10, the storage device 1014 may be integrated into the processing device 1015. The storage device 1014 can be coupled to the bus 1027 for communication with other components of the memory system 1010. Alternatively, the storage device 1014 can be coupled with processing device 1015 in which the processing device 1015 handles communications between the storage device 1014 and other components of the memory system 1010. The storage device 1014 can be coupled to the bus 1027 and to the processing device 1015.

In various embodiments, the firmware 1025 can have instructions, executable by the processing device 1015, to operate on multiple memory devices of the memory devices 1012-1, 1012-2, 1012-3, 1012-4, 1012-5, and 1012-6. The operations can include managing the two L2P areas of storage device 1014 for the memory system 1010. Instructions of the firmware 1025, executed by the processing device 1015, can include operations to: control access to the L2P cache in the storage device 1014 and the L2P changelog in the storage device 1014 with the L2P cache being different from the L2P changelog, the L2P changelog containing pairs of a logical block address and a physical address, where the logical block address is mapped to the physical address in a memory system; and access a PPT in the L2P cache, for performance of a write operation in the memory system, to obtain a specific physical address mapped to a specified logical block address from a host, the access based on the PPT loaded into the L2P cache from the L2P changelog. The operations from executing instructions in firmware 1025 can include, for performance of another write operation in the memory system, an access of another PPT, with the other PPT disposed in the L2P changelog, to obtain another physical address mapped to a specified logical block address from a host for the other write operation.

Instructions of the firmware 1025, executed by the processing device 1015, can include a number of operations. The operations can include operations to arrange the L2P changelog as a clustering of PPTs, with each PPT having one or more pairs of a logical block address and a physical address. The operations can include the PPT loaded into the L2P cache from the L2P changelog, based on the PPT being accessed in the L2P changelog a number of times in a specified timeframe equal to or greater than a threshold number of accesses in the specified timeframe. The operations can include: association of a cold status or a hot status to each PPT in the L2P cache; identification of a number, M, of PPTs in the L2P cache as having status of being M coldest of the PPTs in the L2P cache, M being a positive integer; and a flush of the M PPTs in the L2P cache to the memory system, making M slots in the L2P cache available to load new PPTs from the L2P changelog. The new page pointer tables is new with respect to the L2P cache. The operations can include a selection of the number M to maximize memory system parallelism with respect to channels to access the memory system.

The operations from execution of instructions of the firmware 1025 can include a loading of a selected PPT into the L2P cache from the L2P changelog based on the selected PPT being filled with a number, k, of elements, k being a positive integer. The initiation of the loading of the selected PPT into the L2P cache from the L2P changelog can be based on arrival of a k+1 element for the selected PPT. The operations can include performing various functions with respect to the L2P cache and the L2P changelong for read and write operations for the memory system 1010, as taught herein.

Figure 11:
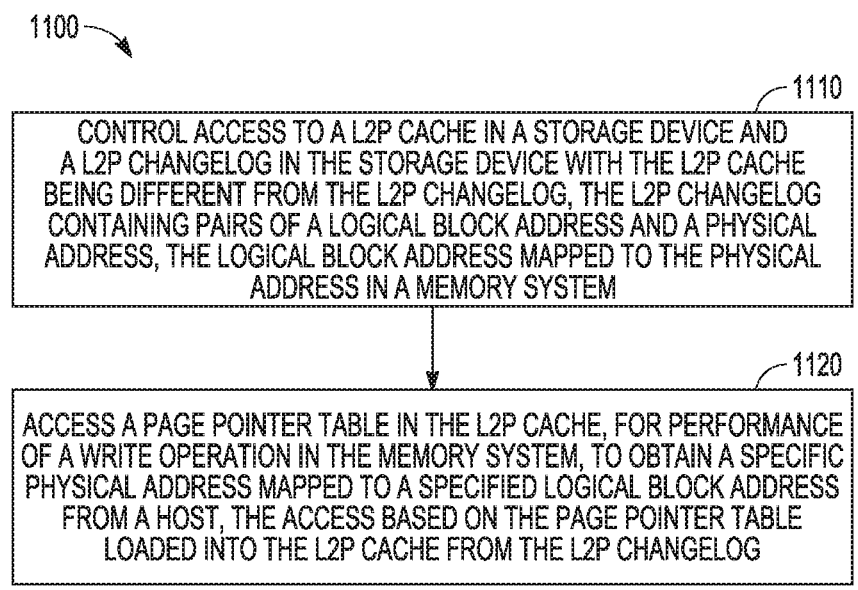
FIG. 11 is a block diagram of features of an example method using a hybrid logical to physical caching scheme, according to various embodiments.

FIG. 11 is a block diagram of features of an embodiment of an example method 1100 of implementing a hybrid logical to physical caching scheme for a memory system with respect to read and write operations in the memory system. Method 1100 can be implemented using a processing device executing instructions stored in firmware. At 1110, access to a L2P cache in a storage device and a L2P changelog in the storage device is controlled with the L2P cache being different from the L2P changelog. The L2P changelog can contain pairs of a logical block address and a physical address, where the logical block address is mapped to the physical address in a memory system. At 1120, a PPT in the L2P cache is accessed, for performance of a write operation in the memory system, to obtain a specific physical address mapped to a specified logical block address from a host, where the access is based on the PPT loaded into the L2P cache from the L2P changelog.

Variations of method 1100 or methods similar to method 1100 can include a number of different embodiments that may be combined depending on the application of such methods and/or the architecture of systems in which such methods are implemented. Such methods can include arranging the L2P changelog as a clustering of page pointer tables, with each page pointer table having one or more pairs of a logical block address and a physical address. Variations of method 1100 or methods similar to method 1100 can include progressively configuring the L2P cache with page pointer tables loaded into the L2P cache from the L2P changelog in which, prior to loading into the L2P cache, the page pointer tables have been accessed in the L2P changelog a number of times greater than a threshold number of accesses in a specified number of latest host accesses.

Variations of method 1100 or methods similar to method 1100 can include using a coldness index of the PPTs in the L2P cache to control loading selected PPTs into the L2P cache from the L2P changelog. Such methods can include loading a specific PPT from a memory device of the memory system into the L2P cache, in response to an element received for inclusion in the specific PPT, where the specific PPT is filled with a maximum number of elements for the specific PPT prior to receiving the element. Then, the specific PPT can be updated in the L2P cache. Following this update, the method can include freeing the specific PPT from a pool of lists of the PPTs in the L2P changelog.

Variations of method 1100 or methods similar to method 1100 can include features as discussed with respect to hybrid logical to physical caching schemes as taught herein. These methods can be implemented in systems, as taught herein, which may have features illustrated in FIGS. 1-10.

Firmware for operation of one or more memory devices in a managed system can comprise instructions, such as a microcode, which when executed by a processing device, can cause performance of operations, the operations including operations to execute one or more hybrid logical to physical caching schemes as taught herein The processing device can be implemented as a set of one or more processing devices, such as but not limited to a set of one or more processors, a set of one or more memory controllers, or combinations thereof.

The operations performed by executing instructions of firmware by a processing device can include operations to perform the tasks of method 1100, methods similar to method 1100, or other techniques associated with write and read operations as taught herein. The operations performed by executing instructions of firmware by a processing device can include operations to perform functions of systems as taught herein. Variations of instructions of the above firmware or similar firmware can include a number of different embodiments that may be combined depending on the application of such firmware and/or the architecture of systems in which such firmware is implemented. Such instructions of the firmware, which when executed by a processing device, can cause performance of operations, which operations can include control access to a L2P cache in a storage device and a L2P changelog in the storage device with the L2P cache being different from the L2P changelog, the L2P changelog containing pairs of a LBA and a physical address, the LBA mapped to the physical address in a memory system; and access a PPT in the L2P cache, for performance of a write operation in the memory system, to obtain a specific physical address mapped to a specified LBA from a host, the access based on the PPT loaded into the L2P cache from the L2P changelog. The L2P changelog can be arranged as a clustering of PPTs, with each PPT having one or more pairs of a LBA and a physical address. The operations can include, for performance of another write operation in the memory system, an access of another PPT, with the other PPT disposed in the L2P changelog, to obtain another physical address mapped to a specified LBA from a host for the other write operation.

Instructions of the firmware, which when executed by a processing device, can cause performance of operations, where operations can include the PPT loaded into the L2P cache from the L2P changelog, based on the PPT being accessed in the L2P changelog a number of times in a specified timeframe equal to or greater than a threshold number of accesses in the specified timeframe. The number of times in a specified timeframe equal to or greater than a threshold number of accesses in the specified timeframe can be realized as the most frequently accessed PPTs in the latest host accesses.

Instructions of the firmware, which when executed by a processing device, can cause performance of operations, where operations can include: association of a cold status or a hot status to each PPT in the L2P cache; identification of a number, M, of PPTs in the L2P cache as having status of being M coldest of the PPTs in the L2P cache, M being a positive integer; and a flush of the M PPTs in the L2P cache to the memory system, making M slots in the L2P cache available to load new PPTs from the L2P changelog. The new PPTs are new with respect to the L2P cache. The operations can include a selection of the number M to maximize memory system parallelism with respect to channels to access the memory system.

Instructions of the firmware, which when executed by a processing device, can cause performance of operations, where operations can include a loading of a selected PPT into the L2P cache from the L2P changelog based on the selected PPT being filled with a number, k, of elements, k being a positive integer. The operations can include initiation of the loading the selected PPT into the L2P cache from the L2P changelog based on arrival of a k+1 element for the selected PPT.

In various embodiments, a system can comprise a memory device, a storage device, and firmware. The storage device can have a L2P cache and a L2P changelog with the L2P cache being different from the L2P changelog. The L2P changelog can contain pairs of a LBA and a physical address, where the logical block address mapped to the physical address in the memory device. The storage device can include a random access memory. The firmware can have stored instructions, executable by a processing device, to perform operations to: control access to the L2P cache and the L2P changelog; and access a PPT in the L2P cache, for performance of a write operation in the memory device, to obtain a physical address mapped to a specified logical block address from a host, where the access is based on the PPT loaded into the L2P cache from the L2P changelog. The operations can include, for performance of another write operation in the memory system, an access of another PPT, with the other PPT disposed in the L2P changelog, to obtain another physical address mapped to a specified logical block address from a host for the other write operation.

Variations of such a system and its features, as taught herein, can include a number of different embodiments that may be combined depending on the application of such systems and/or the architecture in which systems are implemented. Variations of a system, as taught herein, can include the L2P changelog being arranged as a clustering of PPTs, with each PPT having one or more pairs of a LBA and a physical address.

Variations of a system, as taught herein, can include the firmware of the system structured to perform a number of functions. The operations of the firmware of the system can include progressive configuration of the L2P cache with PPTs loaded into the L2P cache from the L2P changelog in which, prior to loading into the L2P cache, the PPTs have been accessed in the L2P changelog a number of times greater than a threshold number of accesses in a specified number of latest host accesses. The number of times greater than a threshold number of accesses in a specified number of latest host accesses can be realized with the most frequently accessed PPTs in the latest host accesses. The parameters for setting the values for most frequently accessed and values of the latest host accesses can be set in the firmware.

The operations of the firmware of the system can include control of a loading of selected PPTs into the L2P cache from the L2P changelog by use of a coldness index of the PPTs in the L2P cache prior to initiating the loading of the selected PPTs from the L2P cache. The operations of the firmware of the system can also include a loading of a selected PPT into the L2P cache from the L2P changelog based on the selected PPT being filled with a number, k, of elements, k being a positive integer; an initiation of the loading the selected PPT into the L2P cache from the L2P changelog based on arrival of a k+1 element for the selected PPT; and a removal of the selected PPT from a pool of lists of the PPTs in the L2P changelog.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description.

What is claimed is:

1. A system comprising:
a non-transitory storage device including firmware having stored instructions, executable by a processing device, to perform operations to:
control access to a logical to physical (L2P) cache in a storage device and a L2P changelog in the storage device with the L2P cache being different from the L2P changelog, the L2P changelog containing pairs of a logical block address and a physical address, the logical block address mapped to the physical address in a memory system;
access a page pointer table in the L2P cache, for performance of a write operation in the memory system, to obtain a specific physical address mapped to a specified logical block address from a host, the access based on the page pointer table loaded into the L2P cache from the L2P changelog; and
load the page pointer table into the L2P cache from the L2P changelog, based on the page pointer table being accessed in the L2P changelog a number of times in a specified timeframe equal to or greater than a threshold number of accesses in the specified timeframe.

2. The system of claim 1, wherein the L2P changelog is arranged as a clustering of page pointer tables, with each page pointer table having one or more pairs of a logical block address and a physical address.

3. The system of claim 1, wherein the storage device is a volatile memory storage device.

4. The system of claim 1, wherein the operations include, for performance of another write operation in the memory system, an access of another page pointer table, with the other page pointer table disposed in the L2P changelog, to obtain another physical address mapped to a specified logical block address from a host for the other write operation.

5. The system of claim 1, wherein the operations include:
association of a cold status or a hot status to each page pointer table in the L2P cache;
identification of a number, M, of page pointer tables in the L2P cache as having status of being M coldest of the page pointer tables in the L2P cache, M being a positive integer; and
a flush of the M page pointer tables in the L2P cache to the memory system, making M slots in the L2P cache available to load new page pointer tables from the L2P changelog, the new page pointer tables being new with respect to the L2P cache.

6. The system of claim 5, wherein the operations include a selection of the number M to maximize memory system parallelism with respect to channels to access the memory system.

7. The system of claim 1, wherein the operations include a loading of a selected page pointer table into the L2P cache from the L2P changelog based on the selected page pointer table being filled with a number, k, of elements, k being a positive integer.

8. The system of claim 7, wherein the operations include initiation of the loading of the selected page pointer table into the L2P cache from the L2P changelog based on arrival of a k+1 element for the selected page pointer table.

9. A system comprising:
a memory device;
a storage device having a logical to physical (L2P) cache and a L2P changelog with the L2P cache being different from the L2P changelog, the L2P changelog containing pairs of a logical block address and a physical address, the logical block address mapped to the physical address in the memory device; and
firmware having stored instructions, executable by a processing device, to perform operations to:
control access to the L2P cache and the L2P changelog;
access a page pointer table in the L2P cache, for performance of a write operation in the memory device, to obtain a physical address mapped to a specified logical block address from a host, the access based on the page pointer table loaded into the L2P cache from the L2P changelog; and
progressively configure the L2P cache with page pointer tables loaded into the L2P cache from the L2P changelog in which, prior to loading into the L2P cache, the page pointer tables have been accessed in the L2P changelog a number of times greater than a threshold number of accesses in a specified number of latest host accesses.

10. The system of claim 9, wherein the storage device is a random access memory.

11. The system of claim 9, wherein the L2P changelog is arranged as a clustering of page pointer tables, with each page pointer table having one or more pairs of a logical block address and a physical address.

12. The system of claim 9, wherein the storage device is a volatile memory storage device.

13. The system of claim 9, wherein the operations include, for performance of another write operation in the memory system, an access of another page pointer table, with the other page pointer table disposed in the L2P changelog, to obtain another physical address mapped to a specified logical block address from a host for the other write operation.

14. The system of claim 9, wherein the operations include control of a loading of selected page pointer tables into the L2P cache from the L2P changelog by use of a coldness index of the page pointer tables in the L2P cache prior to initiating the loading of the selected page pointer tables from the L2P cache.

15. The system of claim 9, wherein the operations include:
a loading of a selected page pointer table into the L2P cache from the L2P changelog based on the selected page pointer table being filled with a number, k, of elements, k being a positive integer;
an initiation of the loading of the selected page pointer table into the L2P cache from the L2P changelog based on arrival of a k+1 element for the selected page pointer table; and
a removal of the selected page pointer table from a pool of lists of the page pointer tables in the L2P changelog.

16. A method comprising:
controlling access to a logical to physical (L2P) cache in a storage device and a L2P changelog in the storage device with the L2P cache being different from the L2P changelog, the L2P changelog containing pairs of a logical block address and a physical address, the logical block address mapped to the physical address in a memory system;
accessing a page pointer table in the L2P cache, for performance of a write operation in the memory system, to obtain a specific physical address mapped to a specified logical block address from a host, the access based on the page pointer table loaded into the L2P cache from the L2P changelog; and
progressively configuring the L2P cache with page pointer tables loaded into the L2P cache from the L2P changelog in which, prior to loading into the L2P cache, the page pointer tables have been accessed in the L2P changelog a number of times greater than a threshold number of accesses in a specified number of latest host accesses.

17. The method of claim 16, wherein the method includes arranging the L2P changelog as a clustering of page pointer tables, with each page pointer table having one or rrore pairs of a logical block address and a physical address.

18. The method of claim 16, wherein the storage device is a volatile memory storage device.

19. The method of claim 16, wherein the method includes using a coldness index of the page pointer tables in the L2P cache to control loading selected page pointer tables into the L2P cache from the L2P changelog.

20. The method of claim 16, wherein the method includes:
loading a specific page pointer table from a memory device of the memory system into the L2P cache, in response to an element received for inclusion in the specific page pointer table, the specific page pointer table filled with a maximum number of elements for the specific page pointer table prior to receiving the element;
updating the specific page pointer table in the L2P cache; and
freeing the specific page pointer table from a pool of lists of the page pointer tables in the L2P changelog.

* * * * *